US009984136B1

(12) United States Patent
Read et al.

(10) Patent No.: US 9,984,136 B1
(45) Date of Patent: May 29, 2018

(54) SYSTEM, METHOD, AND PROGRAM PRODUCT FOR LIGHTWEIGHT DATA FEDERATION

(71) Applicant: ExlService Technology Solutions, LLC, New York, NY (US)

(72) Inventors: David Scott Read, Scotia, NY (US); Scott Van Buren, Scotia, NY (US)

(73) Assignee: ExlService Technology Solutions, LLC, New York, NY (US)

( * ) Notice: Subject to any disclaimer, the term of this patent is extended or adjusted under 35 U.S.C. 154(b) by 421 days.

(21) Appl. No.: 14/663,692

(22) Filed: Mar. 20, 2015

Related U.S. Application Data

(60) Provisional application No. 61/968,675, filed on Mar. 21, 2014, provisional application No. 62/095,538, filed on Dec. 22, 2014.

(51) Int. Cl.
*G06F 17/30* (2006.01)
(52) U.S. Cl.
CPC .. *G06F 17/30566* (2013.01); *G06F 17/30864* (2013.01); *G06F 17/30997* (2013.01)
(58) Field of Classification Search
CPC ......... G06F 17/30292; G06F 17/30545; G06F 17/30566; G06F 17/30864; G06F 17/30997
USPC .......................................................... 707/770
See application file for complete search history.

(56) References Cited

U.S. PATENT DOCUMENTS

| | | | |
|---|---|---|---|
| 5,694,523 A | 12/1997 | Wical | |
| 6,199,034 B1 | 3/2001 | Wical | |
| 6,487,545 B1 | 11/2002 | Wical | |
| 6,510,420 B1 | 1/2003 | Cessna et al. | |
| 7,093,200 B2 | 8/2006 | Schreiber et al. | |
| 7,516,155 B2 | 4/2009 | Ivan et al. | |
| 7,644,052 B1 | 1/2010 | Chang et al. | |
| 7,698,174 B2 | 4/2010 | Brunswig et al. | |
| 7,761,478 B2 | 7/2010 | Akkiraju et al. | |
| 7,797,381 B2 | 9/2010 | Zhang et al. | |

(Continued)

OTHER PUBLICATIONS

Hiroshi Yamada et al., Developing network configuration management database system and its application, 2010, IEEE, 6 pages.*

*Primary Examiner* — Jean B Fleurantin
(74) *Attorney, Agent, or Firm* — Amster, Rothstein & Ebenstein LLP

(57) ABSTRACT

Systems, methods, and program products for federating a plurality of data sources using semantic data models are disclosed. A configuration ontology may be generated for each data source to identify how to access the data source. Generated metadata ontologies may be generated based upon extracted metadata to specify the data present at each data source. Domain ontologies may be generated for one or more target data environments that comprise a respective lexicon for specifying queries of the plurality of data sources. Bridge ontologies may be generated comprising electronic mappings between each data source and each domain ontology. For each data source that cannot be queried in place, a re-hosted data ontology may be generated by extracting the data and converting it to a corresponding triple data structure based upon the respective bridge ontology and the respective extracted metadata. Queries may then be directed to the plurality of data sources.

20 Claims, 13 Drawing Sheets

(56) References Cited

U.S. PATENT DOCUMENTS

| | | |
|---|---|---|
| 7,822,770 B2 | 10/2010 | Lemcke et al. |
| 7,930,293 B2 | 4/2011 | Fox et al. |
| 7,937,319 B2 | 5/2011 | Kennis et al. |
| 8,214,401 B2 | 7/2012 | Rao et al. |
| 8,234,619 B2 | 7/2012 | Polly et al. |
| 8,335,778 B2 | 12/2012 | Ghosh et al. |
| 8,412,746 B2 * | 4/2013 | Fox et al. ............... 707/803 |
| 8,478,766 B1 | 7/2013 | Tsypliaev et al. |
| 8,522,195 B2 | 8/2013 | Miloslaysky et al. |
| 8,527,443 B2 | 9/2013 | B'Far et al. |
| 8,548,938 B2 * | 10/2013 | Amaru et al. ............. 707/603 |
| 8,631,046 B2 | 1/2014 | B'Far et al. |
| 2005/0234889 A1 * | 10/2005 | Fox et al. ................. 707/3 |
| 2007/0112718 A1 | 5/2007 | Liu et al. |
| 2007/0179826 A1 | 8/2007 | Cutlip et al. |
| 2008/0162164 A1 | 7/2008 | Segler et al. |
| 2008/0162266 A1 | 7/2008 | Griessmann et al. |
| 2009/0106105 A1 | 4/2009 | Lewis et al. |
| 2009/0125540 A1 * | 5/2009 | Dettinger et al. ......... 707/102 |
| 2010/0250479 A1 | 9/2010 | Carter |
| 2011/0093469 A1 | 4/2011 | B'Far et al. |
| 2011/0246530 A1 | 10/2011 | Malafsky |
| 2012/0072227 A1 | 3/2012 | Ponnalagu et al. |
| 2012/0198415 A1 | 8/2012 | Brandt |
| 2012/0215592 A1 * | 8/2012 | Amaru et al. ............ 705/7.37 |
| 2013/0117325 A1 | 5/2013 | Heidasch |
| 2013/0262399 A1 * | 10/2013 | Eker ............. G06F 17/30297 707/687 |
| 2013/0325531 A1 | 12/2013 | Van Putten |
| 2013/0332240 A1 | 12/2013 | Patri et al. |
| 2013/0339340 A1 | 12/2013 | Pfitzner |
| 2014/0229405 A1 | 8/2014 | Govrin et al. |

* cited by examiner

SYSTEM, METHOD, AND PROGRAM PRODUCT FOR LIGHTWEIGHT DATA FEDERATION

CROSS-REFERENCE TO RELATED APPLICATION

This application claims the benefit of U.S. Provisional Application Ser. No. 61/968,675, filed Mar. 21, 2014, entitled "LIGHTWEIGHT DATA FEDERATOR," and U.S. Provisional Application Ser. No. 62/095,538, filed Dec. 22, 2014, entitled "SYSTEM, METHOD, AND PROGRAM PRODUCT FOR LIGHTWEIGHT DATA FEDERATION," the contents each of which are incorporated by reference as if fully set forth herein.

FIELD

The present invention generally relates to systems, methods, and program products for federating a plurality of data sources using semantic data models.

SUMMARY

Systems, methods, and program products for federating a plurality of data sources using semantic data models are disclosed.

In embodiments, a computer-implemented method for federating a plurality of data sources can comprise generating, using a data federation computer system, electronic configuration triple data structures for each of a plurality of data sources by performing the following steps for each of the plurality of data sources: identifying, using a data federation computer system, the respective data source; identifying, using the data federation computer system, respective access data used to access the respective data source; converting, by the data federation computer system, the respective access data to corresponding electronic configuration triple data structures based at least in part upon a common configuration ontology; and storing in non-transitory computer-readable memory comprising at least one triplestore database, by the data federation computer system, the electronic configuration triple data structures. The method may further comprise generating, using the data federation computer system, a generated metadata ontology for each of the plurality of data sources by performing the following steps for each of the plurality of data sources: accessing, by the data federation computer system, the respective data source using the respective access data identified by the respective electronic configuration triple data structures; extracting, by the data federation computer system, respective metadata from the respective data source, wherein the respective metadata identifies respective data specified in respective data structures; converting, by the data federation computer system, the extracted respective metadata to corresponding respective electronic metadata triple data structures based at least in part upon a common metadata ontology; and storing in the non-transitory computer-readable memory, by the data federation computer system, the respective electronic metadata triple data structures to form a respective generated metadata ontology for each respective data source. The method may further comprise generating, using the data federation computer system, a domain ontology corresponding to a first target data environment, wherein the first target data environment comprises a respective lexicon for specifying queries of the plurality of data sources; storing, using the data federation computer system, the domain ontology; for each of the plurality of data sources, generating, using the data federation computer system, a bridge ontology comprising an electronic mapping between the generated metadata ontology for the respective data source and the domain ontology; determining, by the data federation computer system, a subset of the plurality of data sources that cannot be queried in place; generating, by the data federation computer system, a re-hosted data ontology for each of the subset of the plurality of data sources by performing the following steps for each of the subset of the plurality of data sources: extracting, by the data federation computer system, respective data from the respective data source; converting, by the data federation computer system, the respective extracted data to corresponding electronic data triple data structures based upon the respective bridge ontology; and storing in the non-transitory computer-readable memory, by the data federation computer system, the electronic data triple data structures to form a re-hosted data ontology. In embodiments, the method may include correlating, by the data federation computer system, a query expressed in the domain ontology to the data from the plurality of data sources using the re-hosted data ontologies for each of the subset of the plurality of data sources and using the bridge ontologies for the remaining data sources.

In embodiments, the respective access data may comprise identifications of an access point for the respective data source, a source type, connection information, and a target domain corresponding to the respective data source.

The data sources may comprise various types of data sources. For example, in embodiments, at least one of the plurality of data sources may be an external data source. In embodiments, at least one of the plurality of data sources may be a relational database. In embodiments, at least one of the plurality of data sources may be a non-relational database. In embodiments, at least one of the plurality of data sources may be a flat file, such as a spreadsheet. In embodiments, at least one of the plurality of data sources may be a web service. In embodiments, at least one of the plurality of data sources may be a semantic data source comprising a semantic data endpoint. In embodiments, at least one of the plurality of data sources may be a non-semantic data source comprising a non-semantic data endpoint.

In embodiments, where a data source is a non-semantic data source, the computer-implemented method may further comprise providing, by the data federation computer system, a semantic data endpoint for the non-semantic data endpoint. Providing a semantic data endpoint may comprise implementing a wrapper tool. The wrapper tool may comprise a translation of the respective bridge ontology that expresses the respective data source in a semantic language corresponding to the domain ontology. In embodiments, the wrapper tool may be a web service wrapper tool that provides a semantic data endpoint for a non-semantic web service.

In embodiments, the domain ontology may be based at least in part upon an upper domain ontology comprising identifications of data structure relationships applicable to a plurality of target data environments.

In embodiments, the bridge ontology may comprise an electronic mapping between the generated metadata ontology for the respective data source and a plurality of domain ontologies, wherein each of the plurality of domain ontologies corresponds to a respective target data environment comprising a respective lexicon for specifying queries of the plurality of data sources.

In embodiments, the computer-implemented method may further comprise the step of generating, using the data federation computer system, a second bridge ontology comprising an electronic mapping between the domain ontology and a first sub-domain ontology wherein the first sub-domain ontology corresponds to a respective lexicon for specifying queries of the plurality of data sources. In embodiments, the method may further comprise generating, using the data federation computer system, a third bridge ontology comprising an electronic mapping between the domain ontology and a second sub-domain ontology wherein the second sub-domain ontology corresponds to a respective lexicon for specifying queries of the plurality of data sources. In embodiments, the respective lexicon corresponding to a sub-domain ontology may comprise variations in the respective lexicon corresponding to the domain ontology. In embodiments, queries may be specified in a lexicon corresponding to a sub-domain ontology.

In embodiments, a system for federating a plurality of data sources can comprise one or more processors; one or more storage devices comprising non-transitory computer-readable memory storing one or more databases, wherein at least one database is a semantic triplestore database; a data source configuration module stored on the one or more storage devices and configured to generate electronic configuration triple data structures for each of the plurality of data sources by identifying the respective data source, identifying respective access data used to access the respective data source, converting the respective access data to corresponding electronic configuration triple data structures based at least in part upon a common configuration ontology, and storing the electronic configuration triple data structures; a metadata ontology module stored on the one or more storage devices and configured to generate a metadata ontology for each of the plurality of data sources by accessing the respective data source using the respective access data, extracting respective metadata identifying respective data specified in respective data structures, converting the extracted respective metadata to corresponding respective electronic metadata triple data structures based at least in part upon a common metadata ontology, and storing the respective electronic metadata triple data structures; a domain module stored on the one or more storage devices and configured to generate domain ontologies each corresponding to a respective target data environment; a bridging module stored on the one or more storage devices and configured to generate for each data source a bridge ontology mapping the respective data source to a domain ontology; a data extraction module stored on the one or more storage devices and configured to extract source data from one or more data sources; a data conversion module stored on the one or more storage devices and configured to convert extracted source data to corresponding electronic data triple data structures based upon the respective bridge ontology and the respective extracted metadata; and a data model generation module stored on the one or more storage devices and configured to generate data models based at least in part on the domain ontologies, the bridge ontologies, and the metadata triples. In embodiments, the system may further comprise an analytics module stored on the one or more storage devices and configured to determine data from one or more data sources that matches a query specified in a domain ontology.

BRIEF DESCRIPTION OF THE DRAWINGS

Exemplary embodiments of the present invention will be described with references to the accompanying figures, wherein.

DETAILED DESCRIPTION

The present invention generally relates to systems, methods, and program products for federating a plurality of data sources using semantic data models. A plurality of data sources may be bridged to one or more target domains using semantic bridges so that a single query in a lexicon of the target domain may be directed to the plurality of data sources. In embodiments, data from a data source may be converted to a semantic format that may be queried using the lexicon of the target domain, and the converted data may be re-hosted in a semantic database.

Figure 1:
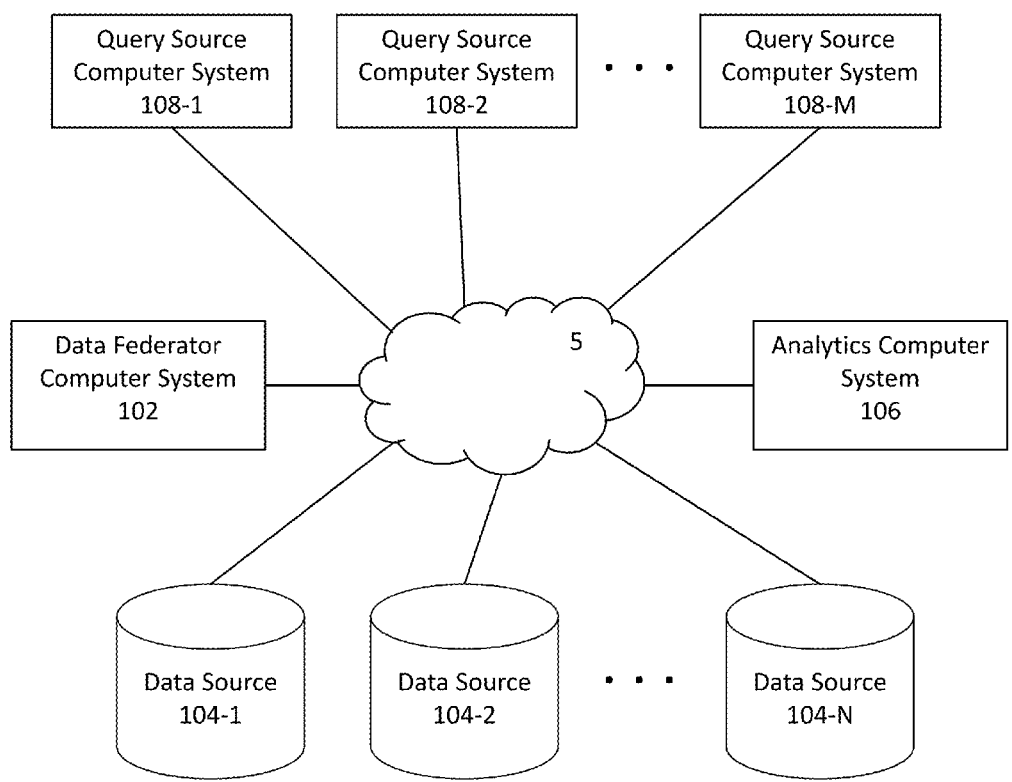
FIG. 1 is a schematic diagram of participants in a system used in federating a plurality of data sources in accordance with exemplary embodiments of the present invention.

FIG. 1 is a schematic diagram showing exemplary participants in a system used in federating a plurality of data sources in accordance with exemplary embodiments of the present invention. The participants may connect directly and/or indirectly, e.g., through a data network 5, such as the Internet, a telephone network, a mobile broadband network (such as a cellular data network), a mesh network, Wi-Fi, WAP, LAN, and/or WAN, to name a few.

A data federator computer system 102 may bridge and federate a plurality of data sources 104 (e.g., 104-1, 104-2, . . . , 104-N). The data federator computer system 102 is described herein with respect to FIG. 2. Data sources 104 can include databases, which may be relational and/or non-relational databases. Databases may be semantic databases, such as triplestores, and/or non-semantic databases. Data sources 104 can also include web services that can provide data over a data network, such as the Internet. Data sources 104 can include flat electronic files, such as spreadsheets and/or PDFs. Data sources 104 may be internal to a customer computer system and/or external to the customer computer system.

One or more query source computer systems 108 (e.g., 108-1, 108-2, . . . , 108-M) may transmit queries of the federated data sources. Such query source computer systems 108 may be computer systems of various business units that wish to query the data sources. In embodiments, a query source computer system 108 may be a user electronic device, such as a computer, laptop computer, tablet computer, mobile phone, smart phone, and/or PDA, to name a few. The query source computer systems 108 may receive queries (e.g., input by users) and transmit the queries to the federated data sources. In embodiments, the query source computer systems 108 may generate queries, e.g., as part of analytic and/or data retrieval processes.

An analytics computer system 106 may analyze the federated data, generate data models using the federated data, identify trends in the federated data, and/or generate predictions based upon the federated data, to name a few. In embodiments, the analytics computer system 106 may provide electronic reports to one or more user electronic devices based upon the federated data.

The computer systems described herein may comprise one or more computers. Each computer may include one or more processors and non-transitory computer-readable memory operatively connected to the one or more processors. Such computer-readable memory may be internal to a computer system and/or external and may comprise one or more hard drives, disk drives and disks, tape drives and tapes, and/or flash memory storage devices, to name a few. One or more databases may be stored on the computer-readable memory. In embodiments, databases may be relational databases, non-relational databases, and/or semantic triplestore databases, to name a few. Computer systems may also comprise input devices (e.g., keyboards, mice, touchscreens, microphones, cameras, to name a few) and/or output devices (e.g., display screens, projectors, and/or speakers, to name a few).

Still referring to FIG. 1, the participants in the system may include communication portals, which may handle, process, support, and/or perform wired and/or wireless communications (e.g., transmitting and/or receiving data). Communications systems can comprise hardware (e.g., hardware for wired and/or wireless connections) and/or software. In embodiments, communications systems can include one or more communications chipsets, such as a GSM chipset, CDMA chipset, LTE chipset, Wi-Fi chipset, Bluetooth chipset, to name a few, and/or combinations thereof. Wired connections may be adapted for use with cable, plain old telephone service (POTS) (telephone), fiber (such as Hybrid Fiber Coaxial), xDSL, to name a few, and wired connections may use coaxial cable, fiber, copper wire (such as twisted pair copper wire), and/or combinations thereof, to name a few. Wired connections may be provided through telephone ports, Ethernet ports, USB ports, and/or other data ports, such as Apple 30-pin connector ports or Apple Lightning connector ports, to name a few. Wireless connections may include cellular or cellular data connections and protocols (e.g., digital cellular, PCS, CDPD, GPRS, EDGE, CDMA2000, 1xRTT, Ev-DO, HSPA, UMTS, 3G, 4G, and/or LTE, to name a few), Bluetooth, Bluetooth Low Energy, Wi-Fi, radio, satellite, infrared connections, ZigBee communication protocols, to name a few. Communications interface hardware and/or software, which may be used to communicate over wired and/or wireless connections, may comprise Ethernet interfaces (e.g., supporting a TCP/IP stack), X.25 interfaces, T1 interfaces, and/or antennas, to name a few.

Figure 2:
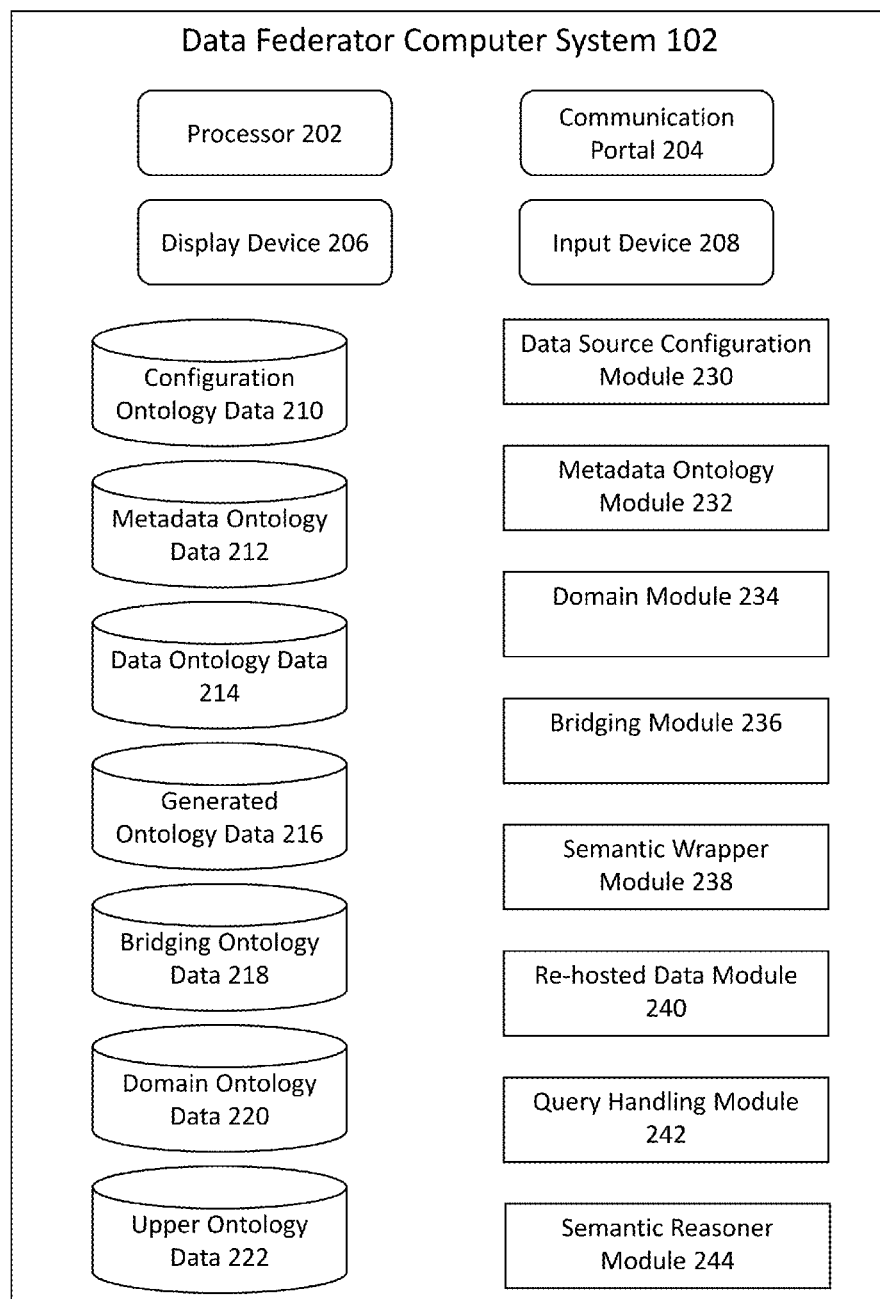
FIG. 2 is a schematic diagram of a data federator computer system used to federate a plurality of data sources in accordance with exemplary embodiments of the present invention.

FIG. 2 is a schematic diagram of a data federator computer system 102 used to federate a plurality of data sources in accordance with exemplary embodiments of the present invention. The data federator computer system may include one or more processors 202, a communication portal 204, a display devices 206, and/or input devices 208. The data federator computer system may comprise one or more databases stored in non-transitory computer readable memory. In embodiments, the data described herein may be stored in the same database, separate databases, and/or combinations of databases.

Configuration ontology data 210 may comprise access data for each data source. The respective access data can comprise identifications of an access point for the respective data source (e.g., a URL, file path, or other electronic address for the data source), a source type (e.g., identifying the type of data source, such as a flat file, file type, database type), connection information (e.g., login credentials, such as a username and password), and/or a target domain corresponding to the respective data source. Accordingly, a configuration ontology for each data source may describe how to access each data source and/or may provide electronic instructions therefor. Configuration ontology data 210 may comprise electronic configuration triple data structures. In embodiments, the configuration triple data structures for each data source may conform to a single configuration ontology (e.g., a general configuration ontology) that specifies the data and/or data relationships that would be needed or desired to connect to a data source.

Metadata ontology data 212 may describe data structures and/or data relationships for metadata. In embodiments, a metadata ontology may provide a framework for extracting particular metadata from each of the plurality of data sources and/or for generating a generated metadata ontology for each data source. For example, a metadata ontology 212 may define elements such as a data attribute and may dictate how columns of a spreadsheet may be linked as data attributes using a triple data structure.

Data ontology data 214 may describe data structures and/or data relationships for data. The data ontology 214 may comprise instructions for reading, importing, and/or organizing data from one or more data sources.

Generated ontology data 216 may be a generated metadata ontology that describes the actual metadata and/or the actual data for a particular data source. Accordingly, the system described herein may generate a generated metadata ontology for each data source. A generated metadata ontology may be based upon extracted metadata from the data source. It may also be based upon a common metadata ontology, such as that stored as metadata ontology data 212. The generated metadata ontology may comprise metadata triples, which may be formed by extracting metadata from a data source and converting the extracted metadata into electronic triple data structures. In embodiments, the conversion to metadata may be based upon the common metadata ontology.

Domain ontology data 218 may comprise one or more domain ontologies. A domain ontology may correspond to a first target data environment that comprises a respective lexicon for specifying queries of the plurality of data sources. Accordingly, a domain ontology may describe the data expressions and formats used in the respective data environment, such as a business or a business unit. In embodiments, domain ontology data 218 can include sub-domains, which may be groups within a domain having variations of the lexicon of the domain. For example, a particular business unit or business group may have its own lexicon. In embodiments, a sub-domain lexicon may include only minor changes to the lexicon of the domain. In embodiments, a second bridge ontology may be developed to relate the sub-domain to the domain so that queries in the lexicon of the sub-domain may be directed, through the domain ontology, to the plurality of data sources.

Upper ontology data 220 may comprise an over-arching ontology representing broader concepts that may be shared by a plurality of domain ontologies. The upper ontology may be used in generating a domain ontology. The upper ontology may simplify the generation of a domain ontology by providing pre-defined relationships that may be used in the domain ontology. For example, in embodiments, an upper ontology for a healthcare business type may be used to generate domain ontologies for specific healthcare businesses or business units.

Bridging ontology data 222 may comprise one or more bridge ontologies. Each bridge ontology may relate a data source to a target domain. Accordingly, each bridge ontology may comprise an electronic mapping between the generated metadata ontology for the respective data source and the domain ontology of the target domain. The bridge ontologies may be used to direct queries specified in a lexicon of a target domain to a plurality of data sources without specifying multiple queries for the multiple data sources and without normalizing the data from each data source to a common format. Instead, the bridge ontologies may provide a semantic translation between data sources and target domains.

One or more modules may be stored in the computer-readable memory and may run or be configured to run on the one or more processors 202. The modules may perform and/or facilitate performance of processes to bridge and/or federate a plurality of data sources and/or to handle queries of the plurality of data sources. In embodiments, one or more modules may perform tasks described herein with respect to one or more other modules.

A data source configuration module 230 may generate a configuration ontology for one or more data sources (e.g., a general configuration ontology specifying the type of information required to access a data source) and/or may generate configuration triple data structures for storing configuration information for particular data sources. Configuration information may include access data for the respective data sources. The data source configuration module 230 may identify data sources and their respective access data, convert such information into electronic triple data structures, and/or store the triple data structures (e.g., in a triplestore).

A metadata ontology module 232 may be used to generate a generated metadata ontology for each data source. Such a module may extract metadata from each data source and/or analyze each data source to determine its metadata. The module may convert the extracted metadata to electronic metadata triple data structures. The module may also be used to develop an overarching metadata ontology to inform the creation of generated metadata ontologies for each data source.

A domain module 234 may be used to generate a domain ontology for each target domain and/or to generate a sub-domain ontology for each sub-domain. The module may receive inputs identifying components of a lexicon of a domain environment and may generate a domain ontology based at least in part upon such inputs. The domain module 234 may also generate and/or store an upper domain ontology, which it may use in generating particular domain ontologies.

A bridging module 236 may generate a bridge ontology for each data source/domain environment pair. The bridging module 236 may map data types identified in a generated metadata ontology for a data source to an expression of such data type in a domain ontology. In embodiments, the bridging module 236 may provide a user interface for performing the mapping and/or for editing computer-generated mappings.

A semantic wrapper module 238 may generate a wrapper to provide a semantic endpoint for a particular data source. In embodiments, such a module may provide a general wrapper, which may be adapted to particular input data sources and/or output ontologies, as needed. In embodiments, a semantic wrapper module 238 may provide a semantic wrapper tool for a web service. In embodiments, a semantic wrapper module 238 may adapt ontologies to work with an existing wrapper tool. The module may use a respective bridge ontology to configure a wrapper to provide a semantic endpoint consistent with the desired target domain ontology.

A re-hosted data module 240 may import, convert, and store data, which may not otherwise be queried in place at its data source (e.g., due to slow connection speeds, unreliable connections, and/or incompatible formats for responding to remote queries such as may be the case with flat files). Accordingly, the module may be used to determine and/or identify which data sources must be re-hosted. In embodiments, data from a data source may be re-hosted even if it is capable of being queried in place. In embodiments, the generated metadata ontology for the data source may be used to determine what data to extract. The module may extract data in accordance with data structures specified by a data ontology. The module may convert such extracted data to semantic triple data structures, which it may then store (e.g., in a triplestore database). The resulting triple data structures may express the extracted data in a form compatible with a semantic ontology for a target domain. As such, the conversion may be based on a bridge ontology for the data source.

A query handling module 242 may process queries specified in a particular lexicon corresponding to a domain ontology or sub-domain ontology. The query handling module 242 may direct the query to the plurality of data sources using the respective bridge ontologies and/or the re-hosted data comprising triple data structures. The query handling module may provide a user interface for specifying queries and/or a user interface for receiving query results. The query handling module may format query results in the lexicon of the query source (e.g., the domain or sub-domain in which the query was specified) and/or in a separately specified lexicon that is also mapped (e.g., via bridge ontologies).

A semantic reasoner module 244 may perform semantic reasoning, e.g., based upon the system's ontologies, input terms (e.g., query terms), and/or re-hosted data. The semantic reasoned module 244 may infer logical consequences and/or relationships among data. Accordingly, the semantic reasoned module 244 may be used in conjunction with a query handling module 242 to process queries.

Figure 3:
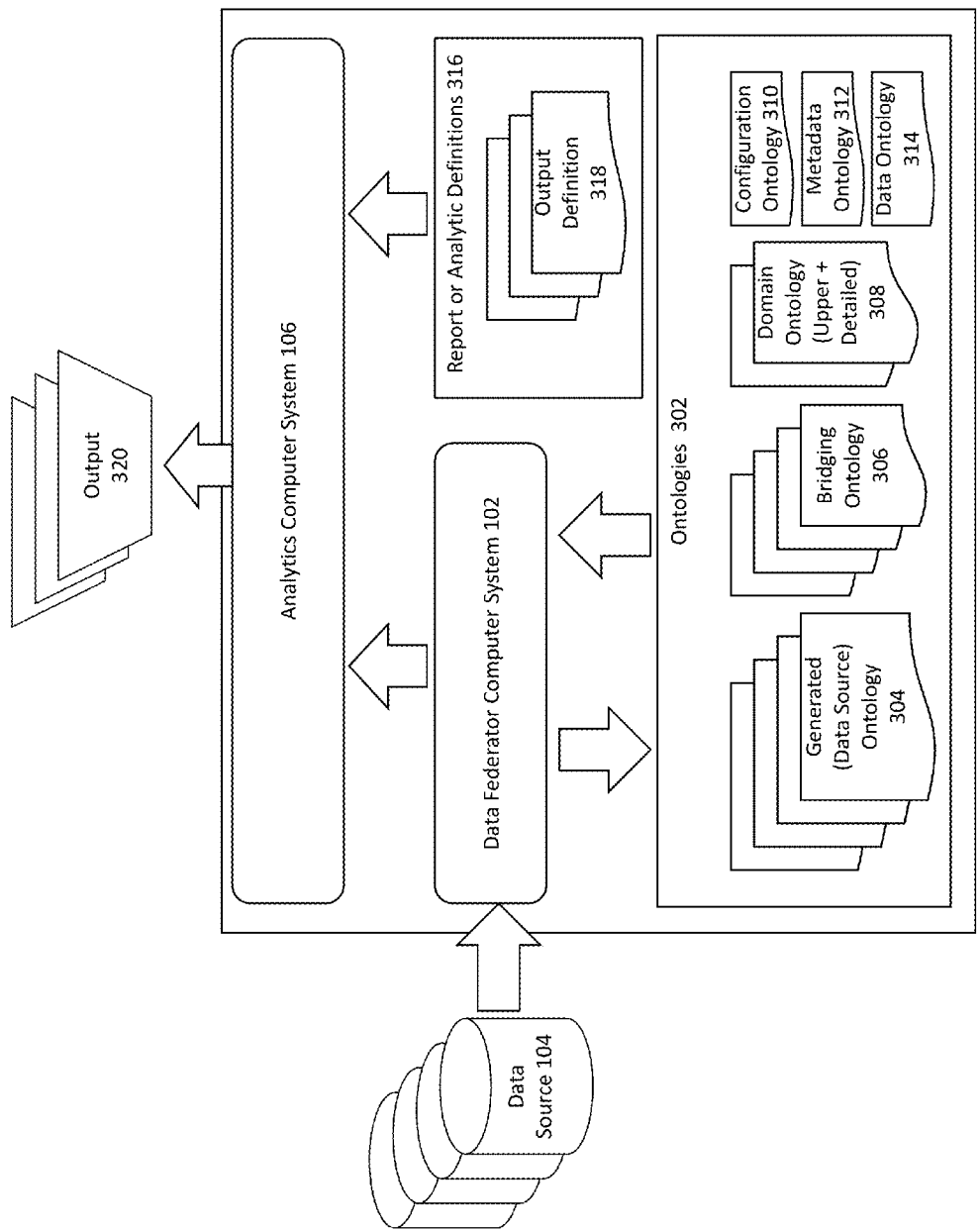
FIG. 3 is a schematic diagram of an exemplary system used in federating a plurality of data sources in accordance with exemplary embodiments of the present invention.

FIG. 3 is a schematic diagram of an exemplary system used in federating a plurality of data sources in accordance with exemplary embodiments of the present invention. As illustrated, a data federator computer system 102 may receive data from a plurality of data sources 104. The data federator computer system 102 may generate and/or access a plurality of ontologies 302, such as a configuration ontology 310, metadata ontology 312, data ontology 314, generated metadata ontologies 304 for each data source, bridging ontologies 306 for each pair of data sources and target domains, and/or domain ontologies 308, which may include one or more upper domain ontologies and, for each target domain, detailed domain ontologies. Such semantic ontologies are described herein with respect to FIG. 2.

Still referring to FIG. 3, an analytics computer system 106 may receive data from the data federator computer system 102 (e.g., query results). It may also receive report or analytic definitions 316, which may comprise electronic output definition data 318. Such definition data may identify one or more formats for analytics outputs and/or one or more analytics metrics (e.g., for healthcare, the Medicare Overall Star Ratings, Healthcare Effectiveness Data and Information Set (HEDIS) scores, to name a few). The analytics computer system 106 may output data 320 in response to queries (e.g., from query source computer systems) and/or as electronic reports, which may be generated periodically and/or upon receipt of an electronic request for a report. Requests for reports may identify a type of desired report. Accordingly, the analytics computer system 106 may perform query handling and/or semantic reasoning, as described herein with respect to the data federator computer system 102.

Figure 4:
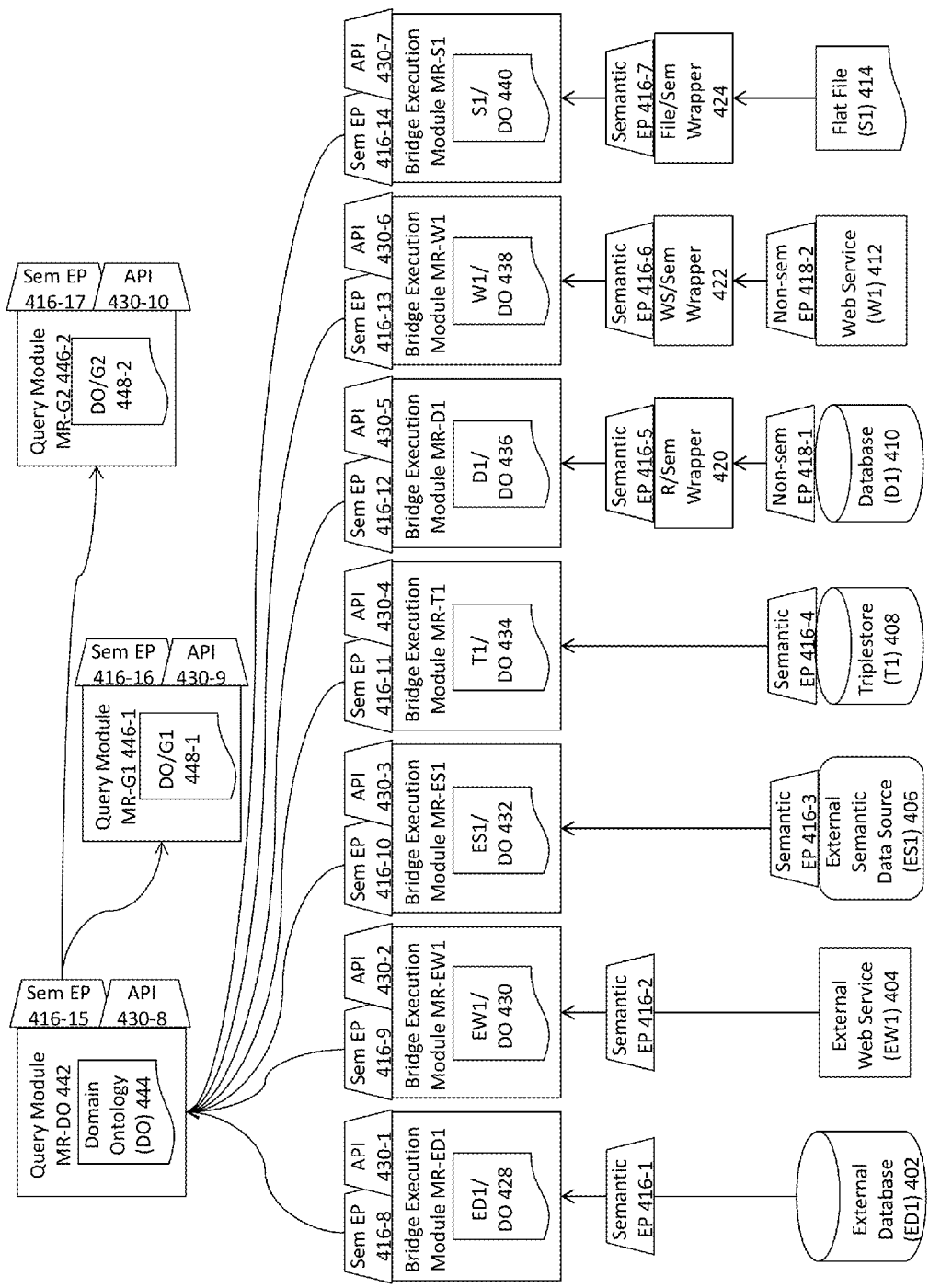
FIG. 4 is a schematic diagram of exemplary data source mappings in accordance with exemplary embodiments of the present invention.

FIG. 4 is a schematic diagram of exemplary data source mappings in accordance with exemplary embodiments of the present invention. The mappings show the semantic bridges between the data sources that can be queried in place and the target domain ontology, as well as sub-domain ontologies.

For data sources already having semantic endpoints (e.g., SPARQL endpoints) capable of receiving and/or responding to semantic queries, queries may be passed directly (e.g., without an intermediate semantic wrapper) from the bridge execution module that applies the respective bridge. Bridge execution modules may be mapping resources, which are logical components that apply a bridge, e.g., between two ontologies. These modules may be logically separated from each other, although in embodiments they may co-exist in a single triplestore. Each bridge execution module may have a semantic endpoint 416 (e.g., semantic endpoints 416-8 . . . 416-14), which can provide an address (e.g., a uniform resource identifier) at which semantic queries (e.g., using a semantic library), such as SPARQL queries, may be directed. A bridge execution module may also have an application programming interface (API) 430 (e.g., API 430-1 . . . 430-7), which can provide an access point for the respective data source. The API can allow native code to be used to access data sources, e.g., expressing queries in the domain ontology associated with the particular bridge.

Accordingly, external database ED1 402, which is a data source having semantic endpoint 416-1, may communicate directly with the bridge execution module MR-ED1, which may be a logical processing module that executes the bridge ED1/DO 428 to relate the external database ED1 402 to the domain ontology 444. Similarly, external web service EW1 404, which is a data source having semantic endpoint 416-2, may communicate directly to the bridge execution module MR-EW1, which applies the bridge EW1/DO 430 to relate the external web service EW1 404 to the domain ontology 444. External semantic data source ES1 406, which can be any semantic data source, with semantic endpoint 416-3 may communicate with bridge execution module MR-ES1, which can apply the bridge ES1/DO 432. A triplestore T1 408 data source with a semantic endpoint 416-4 may communicate with bridge execution module MR-T1, which can apply the bridge T1/DO 434.

A database D1 410, which is a non-semantic database, may have a non-semantic endpoint 418-1. A semantic wrapper 420 may be used to provide a semantic endpoint 416-5 for the non-semantic database. Accordingly, the exemplary R/Sem semantic wrapper 420 relates a relational database to a semantic ontology. In embodiments, semantic wrappers may provide semantic endpoints for non-relational databases and/or other types of data sources. The present invention provides a semantic wrapper apparatus for web services. For example, a WS/Sem wrapper 422 may provide a semantic endpoint 416-6 for a data source that is a web service W1 412 with a non-semantic endpoint 418-2. A semantic wrapper 424 may also be provided for a flat file, which may have no query endpoint. A File/Sem wrapper 424 may provide a semantic endpoint 416-7 for exemplary flat file Si 414. In other embodiments, flat files may be re-hosted (e.g., by transforming the file to semantic triple data structures and storing such triple structures), such as if the lack of a query endpoint prevents querying the file in place.

In embodiments, a wrapper may relate a data source to a semantic language that is a target domain ontology by providing a semantic endpoint configured to communicate using the target ontology. Accordingly, the wrapper may comprise a translation of a respective bridge ontology that relates the data source to a target domain ontology. In such a system configuration, a bridge execution module may not be needed to apply a bridge ontology since the wrapper will achieve the result of mapping the data source to the target domain with a semantic endpoint.

In other embodiments, a bridge execution module (e.g., modules MR-D1, MR-W1, and MR-S1) may be used in conjunction with a wrapper tool. In such a configuration, the wrapper may not comprise a translation of the respective bridge ontology but rather may provide a semantic endpoint in an ontology that describes the data in the data source. The bridge execution modules may apply respective bridge ontologies, such as D1/DO bridge ontology 436, W1/DO bridge ontology 438, and S1/DO bridge ontology 440, to relate the data source to the target domain ontology. As described herein, the bridge execution modules may provide their own semantic endpoints (e.g., 416-12 . . . 416-14) and/or APIs (e.g., 430-5 . . . 430-7) for receiving and/or responding to semantic queries.

Query module MR-DO 442 may be a mapping resource that can evaluate queries, such as by parsing a received query and directing it to the plurality of data sources (e.g., via their respective bridge execution modules). The query module MR-DO 442 may apply a domain ontology 444 to process queries. It may have a semantic endpoint 416-15 and/or an API 430-8. Queries may be received (e.g., from a query source computer system or user electronic device) at the semantic endpoint 416-15 or via the API 430-8.

In embodiments, sub-domain groups (e.g., group G1 and group G2) may be data environments that are a subset of the data environment that corresponds to a primary domain DO. Such sub-domain data environments may have respective lexicons that are variations of the lexicon of the primary domain data environment (e.g., having some different terms, having some additional terms, having some different formatting, to name a few). Instead of creating separate bridges for each sub-domain to each of the domain sources, bridges can relate each sub-domain simply to the primary domain, which itself is mapped to the plurality of data sources. Such a configuration can reduce the number of required bridge ontologies and may provide a more efficient system, particularly when the sub-domains have commonalities with the primary domain. Each sub-domain ontology may be processed by a query module, such as query modules MR-G1 446-1 and MR-G2 446-2. These sub-domain mapping resources may each apply a bridge ontology (e.g., DO/G1 448-1, DO/G2 448-2) that maps the sub-domain to the primary domain. The sub-domain mapping resources can have a semantic endpoint (e.g., 416-16, 416-17) and/or an API (e.g., 430-9, 430-10). Accordingly, queries specified in the lexicon of the sub-domain and sent to the mapping resource either at its respective semantic endpoint or using its respective API may be mapped to the primary domain and then to the plurality of data sources.

Figure 5:
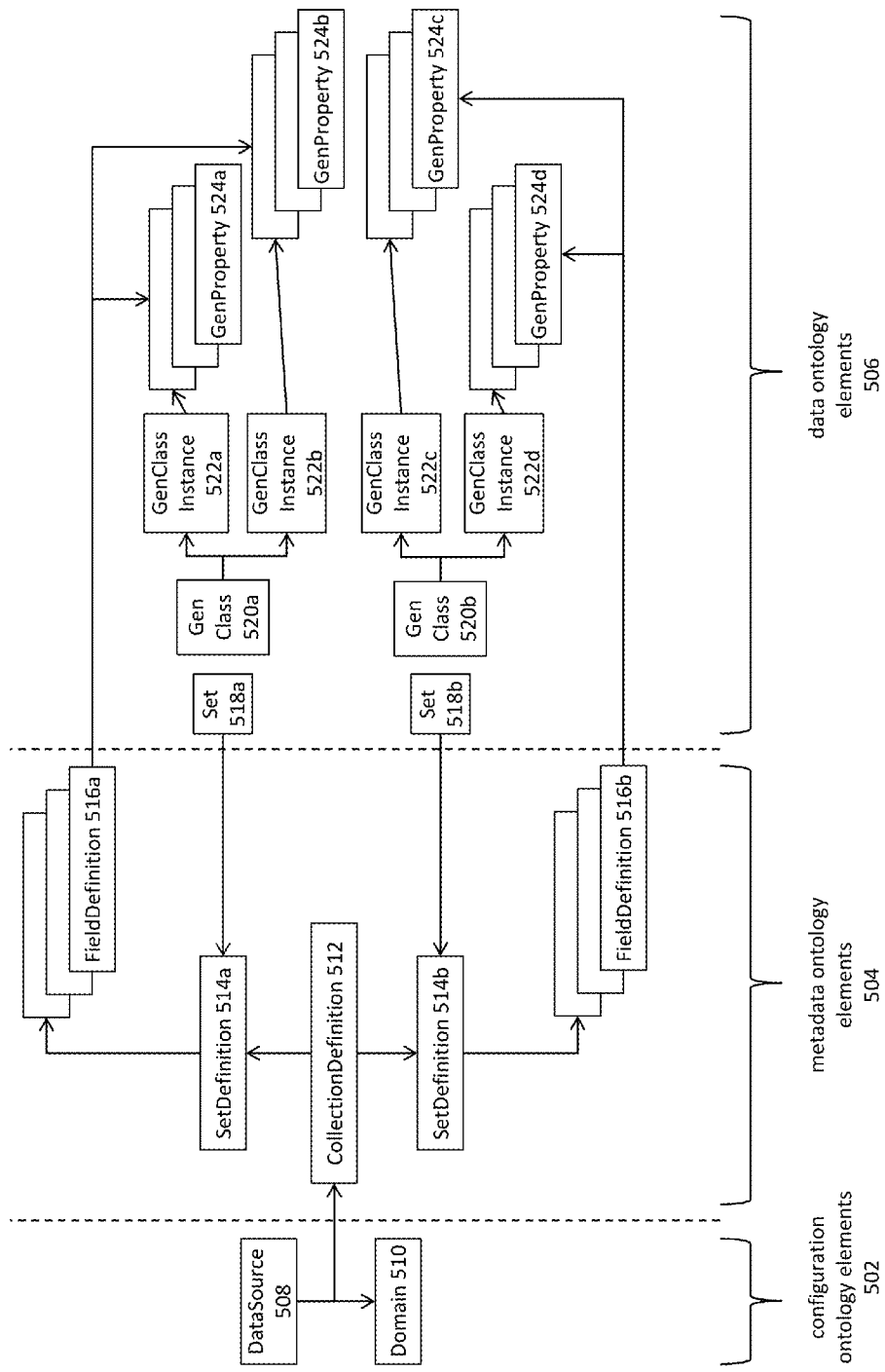
FIG. 5 is a schematic diagram of exemplary semantic data structures in accordance with exemplary embodiments of the present invention.

FIG. 5 is a schematic diagram of exemplary semantic data structures in accordance with exemplary embodiments of the present invention. The diagram illustrates the relationships among exemplary elements in a configuration ontology, a metadata ontology, and a data ontology. Exemplary configuration ontology elements 502 can include DataSource 508, which may be a unique identifier for a particular data source, and Domain 510. These elements can identify a data source and how to access it. Meanwhile, exemplary metadata ontology elements 504 can include a CollectionDefinition 512, SetDefinitions 514a and 514b, and FieldDefinitions 516a and 516b. These elements can comprise definitions that describe the types of data that are present at a data source. Lastly, data ontology elements 506 can describe structures of the data at a data source.

Figure 6A:
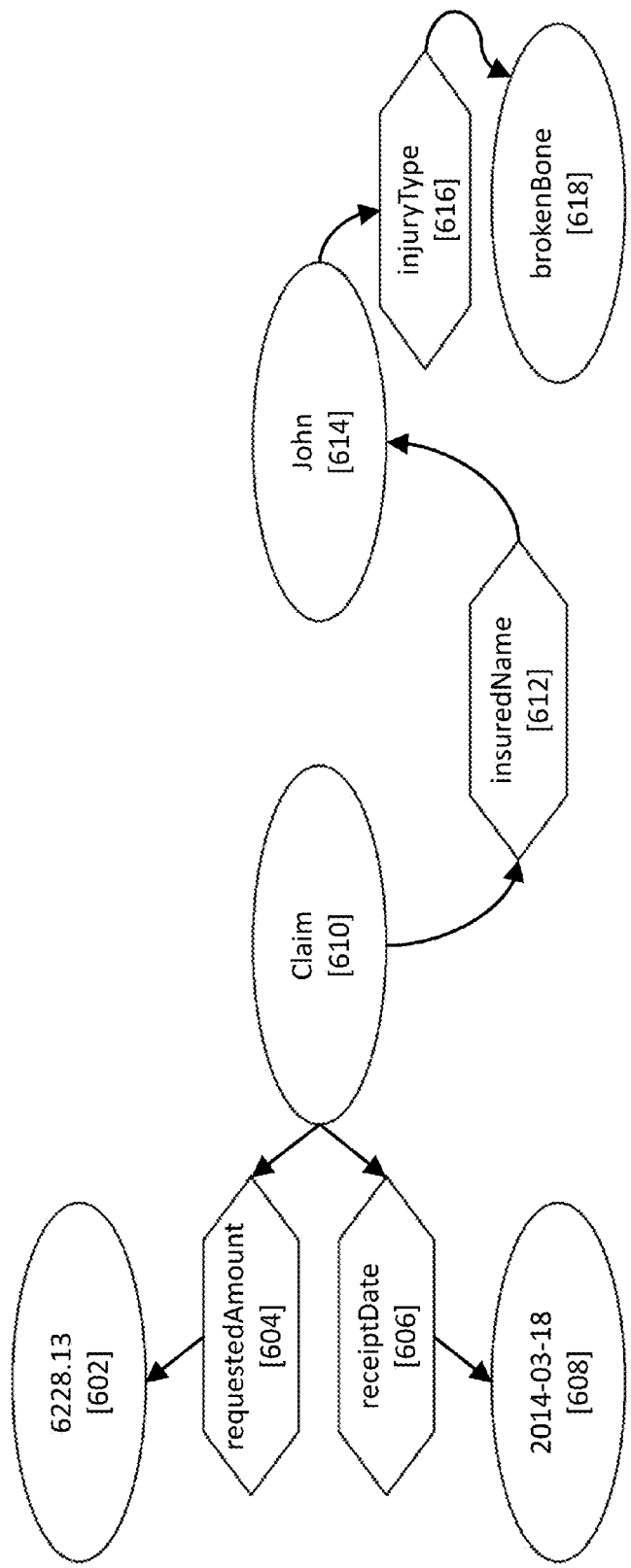
FIG. 6A is a schematic diagram of an exemplary directed graph comprising linked semantic triple data structures in accordance with exemplary embodiments of the present invention.

FIG. 6A is a schematic diagram of an exemplary directed graph comprising linked semantic triple data structures in accordance with exemplary embodiments of the present invention. Triple data structures may be subject, predicate, object structures where the predicate relates the object to the subject. For example, a triple data structure may comprise a receipt date predicate 606 that relates date 2014 Mar. 18 [608] to an insurance claim 610. Accordingly the triple data structure indicates that the insurance claim has a receipt date of 2014 Mar. 18. A second triple data structure may indicate that the claim 610 has a requested amount 604 of 6228.13 [602]. A third triple data structure may indicate that the same claim 610 has a corresponding insured name 612 of John 614. In turn, a fourth triple data structure may indicate that John 614 has an injury type 616 of a broken bone 618. Because multiple triple data structures can have common subjects and common objects and because an object of one triple data structure may be the subject of another triple data structure (e.g., John 614 is the object of the insured name 612 predicate but the subject of the injury type 616 predicate), the triple data structures may form a directed graph comprising inter-relationships of the data stored in the triple data structures.

Figure 6B:
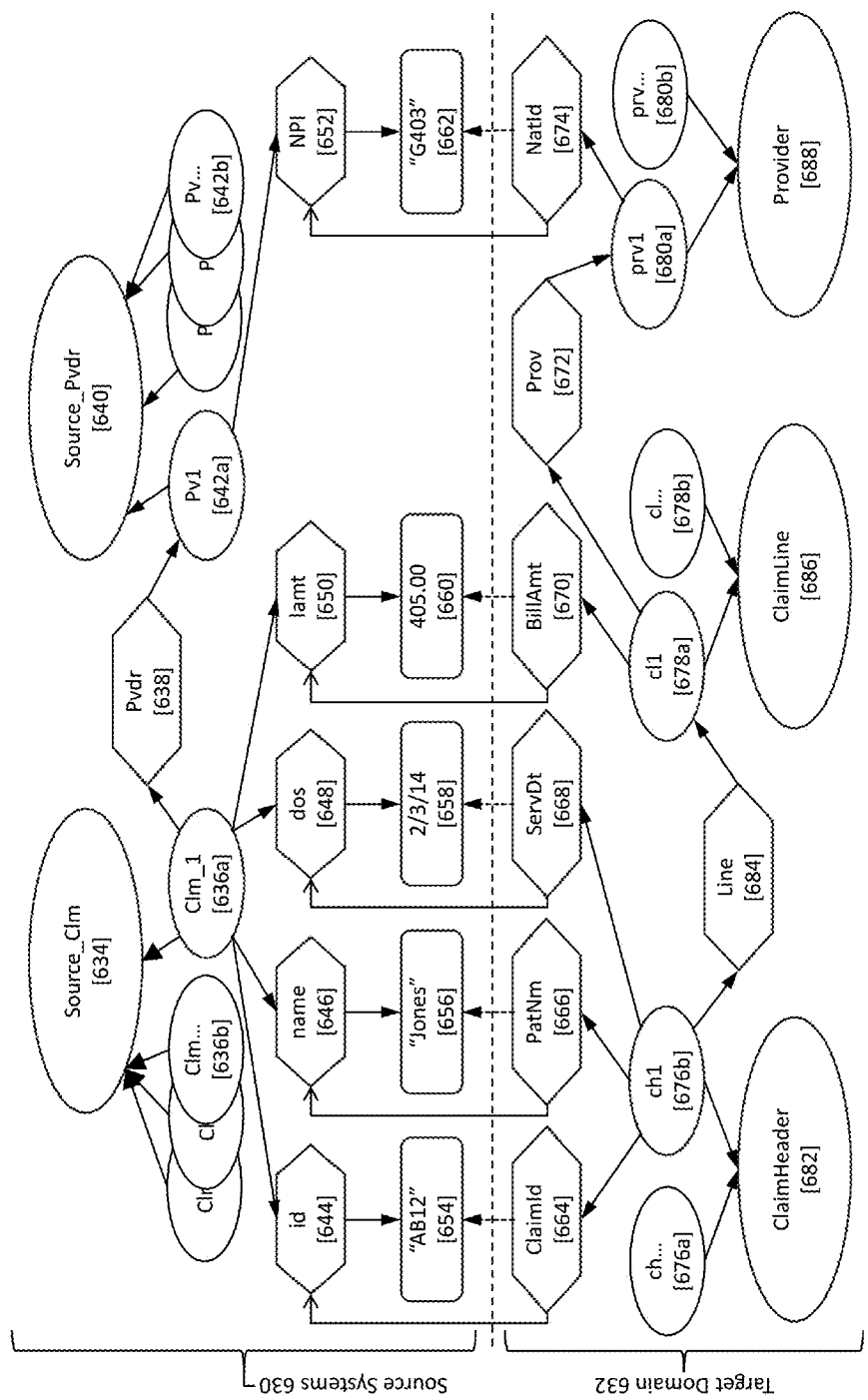
FIG. 6B is a schematic diagram of exemplary directed graphs bridging and federating a plurality of data sources in accordance with exemplary embodiments of the present invention.

FIG. 6B is a schematic diagram of exemplary directed graphs bridging and federating a plurality of data sources in accordance with exemplary embodiments of the present invention. The exemplary directed graph shows semantic linking between one or more data source systems 630 and a target domain 632. The dashed line in the diagram indicates the separation of the data source elements from the properties of the target domain. As an example of the semantic linking, a data source may store a source claim Clm_1 636a, which may have a claim identifier (id) 644 of AB12 654. Meanwhile, a claim header 682 in the target domain may be particular claim header ch1 [676b], which may have a claim identifier property (ClaimID) 664. The system may map (e.g., via a bridge ontology) the different claim identifiers (Claim ID 664 and id 644) to the same object (AB12 [654]), which enables a query specified in the target domain lexicon to access data from the data source. The bridge ontology thus links metadata describing the type of data in a data source (e.g., a type of claim identifier) with properties of the target domains (e.g., a second type of claim identifier).

Figure 7A:
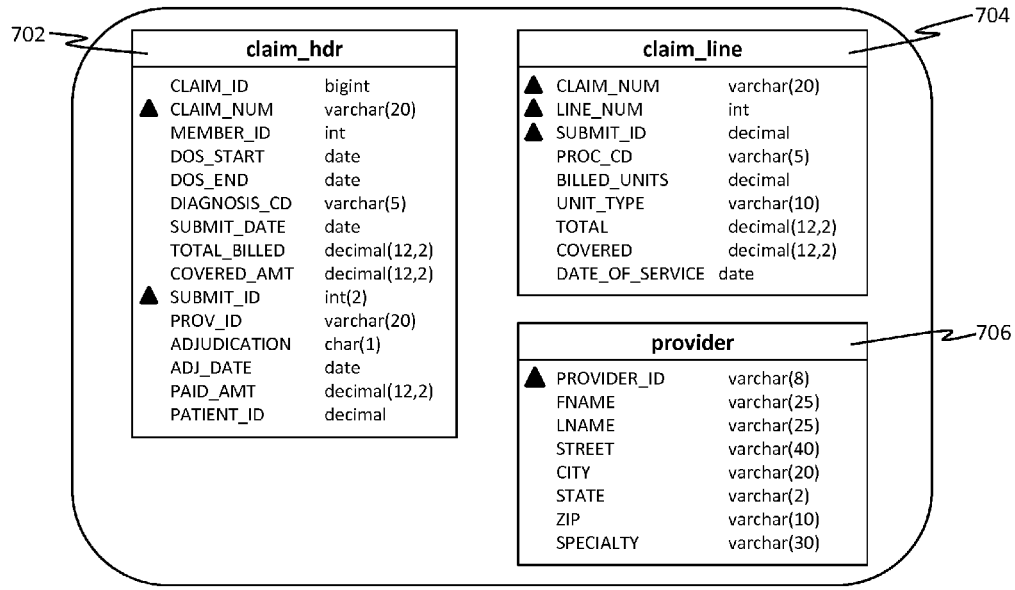
FIGS. 7A-B are schematic diagrams of exemplary insurance claim systems that can be federated in accordance with exemplary embodiments of the present invention.
Figure 7B:
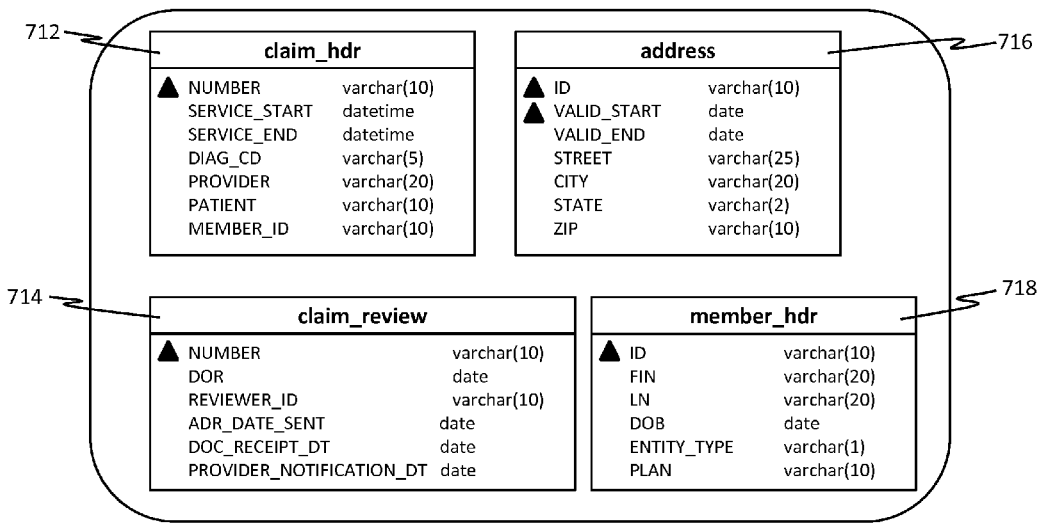

FIGS. 7A-B are schematic diagrams of exemplary insurance claim systems that can be federated in accordance with exemplary embodiments of the present invention. FIG. 7A shows a first exemplary data source, claim system 1. Claim system 1 can include claim header (claim_hdr) information 702, which may be a data class, and which may include a plurality of data class members (e.g. claim identifier (CLAIM_ID), claim number (CLAIM_NUM), patient identifier (PATIENT_ID), to name a few), each of which may comprise a data type (e.g., bigint, varchar (20), decimal, to name a few). Claim system 1 can also include claim line (claim_line) information 704 and provider information 706.

Meanwhile, a second exemplary data source, claim system 2, may include its own data classes, such as claim header (clm_hdr) information 712, claim review (claim_review) information 714, address information 716, and member header (member_hdr) information 718. The data stored in claim system 2 may be different from the data stored in claim system 1, although there may be overlap and/or there may be the same data stored as different data types (e.g., in different formats, such as text strings, decimals, or dates). Once federated in accordance with the bridging methods described herein, data from the different data sources may be accessible in a single system without actually normalizing the data or physically combining the data sources.

Figure 7C:
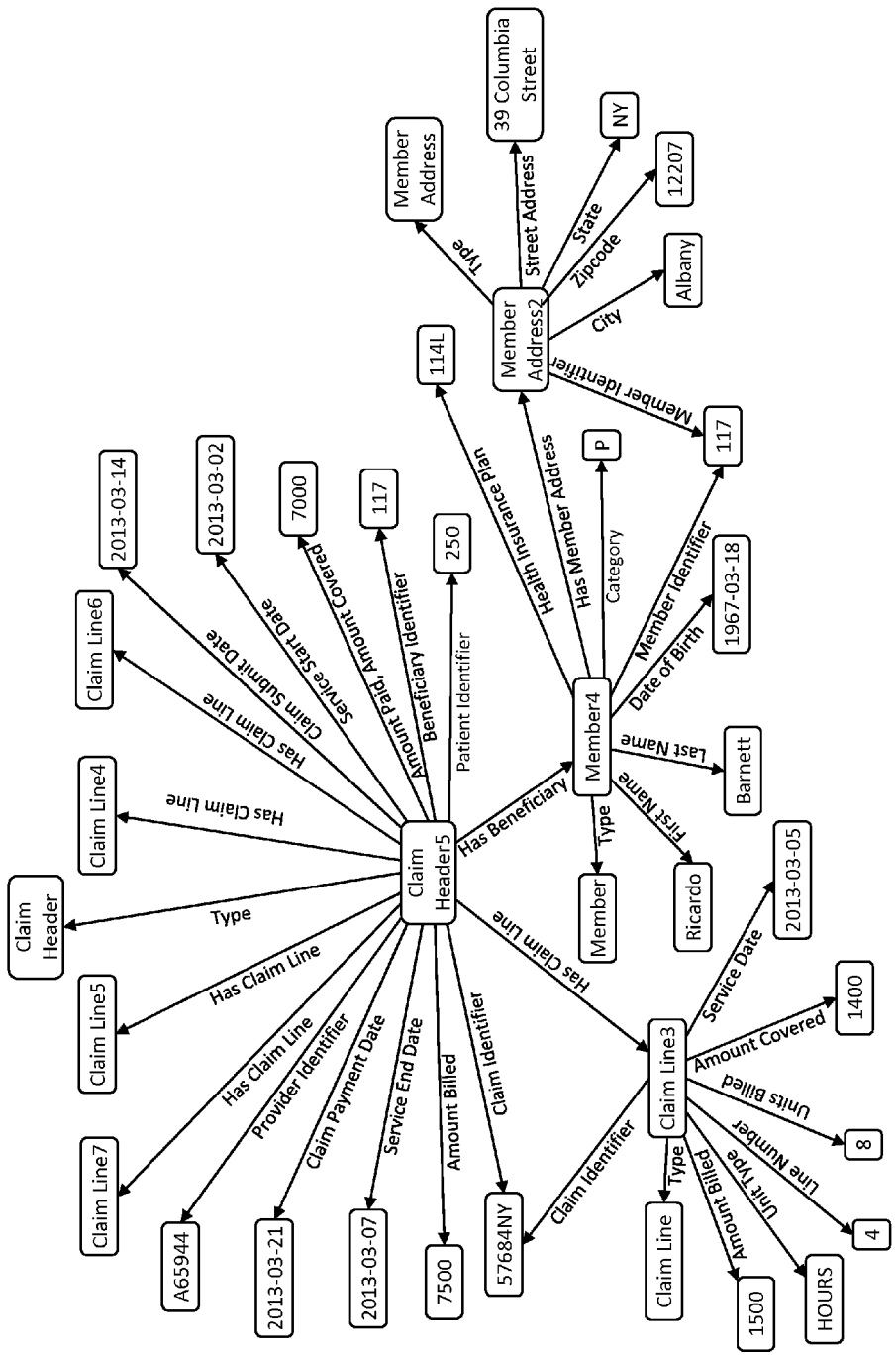
FIG. 7C is a schematic diagram of an exemplary directed graph bridging and federating exemplary insurance claim systems in accordance with exemplary embodiments of the present invention.

Accordingly, FIG. 7C is a schematic diagram of an exemplary directed graph bridging and federating exemplary insurance claim systems (e.g., claim system 1 of FIG. 7A and claim system 2 of FIG. 7B) in accordance with exemplary embodiments of the present invention. The arrows represent the predicates of triple data structures. The exemplary directed graph illustrates how results may be obtained for a query for particular information even where the query criteria may be based upon information provided by a different data source than the query result data. For example, a query for a claimant's street address (the query target) associated with a particular claim line (the query criteria, present in claim system 1) may return a query result comprising the address Member Address2 (present in claim system 2), which may include a street address, state, city, and zipcode. Accordingly, the federated data may provide query results beyond any single data source. In embodiments, query criteria may implicate data from a first plurality of data sources, and/or query results may implicate data from a second plurality of data sources.

Figure 8A:
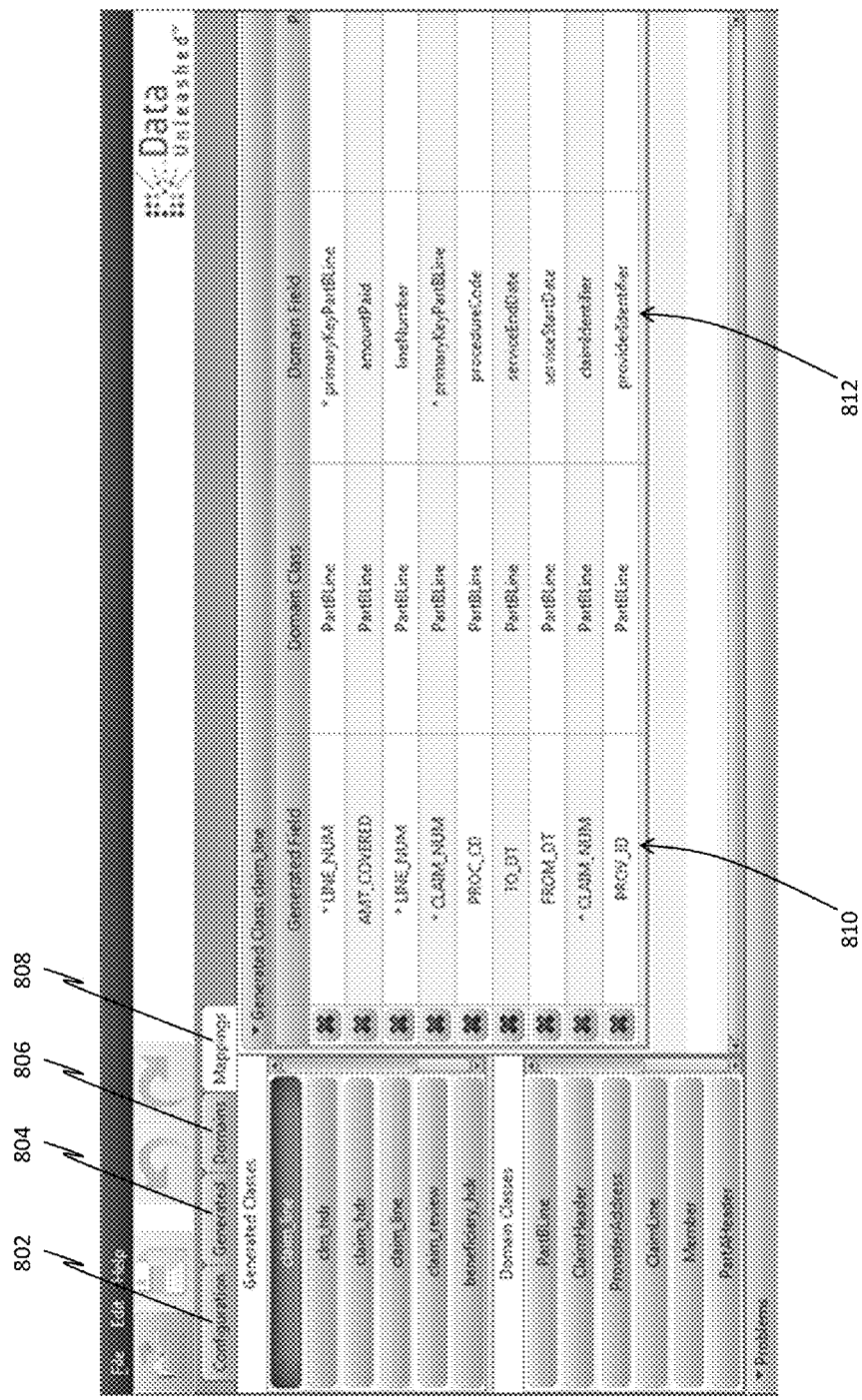
FIG. 8A is an exemplary screen shot of a user interface used in generating bridging ontologies in accordance with exemplary embodiments of the present invention.

FIG. 8A is an exemplary screen shot of a user interface used in generating bridging ontologies in accordance with exemplary embodiments of the present invention. The exemplary user interface may provide a tool to visualize, create, and/or edit components of various ontologies (e.g., a configuration ontology 802, generated metadata ontologies 804, domain ontologies 806, and/or bridging ontologies 808, to name a few). Bridging ontologies 808 may comprise mappings of data items to domain lexicon properties. For example, a provider identifier (PROV_ID) 810 identified in a generated metadata ontology for a data source may be mapped to a provider identifier (providerIdentifier) field 812 of a domain ontology. In embodiments, a data federation computer system may generate one or more ontologies, including one or more bridging ontologies. In embodiments, the computer system may generated recommended ontological structures (e.g., recommended mappings). A user may use the user interface to review and/or edit such ontologies. In embodiments, a user may input, via the user interface, one or more ontological structures (e.g., a mapping or other triple data structures).

Figure 8B:
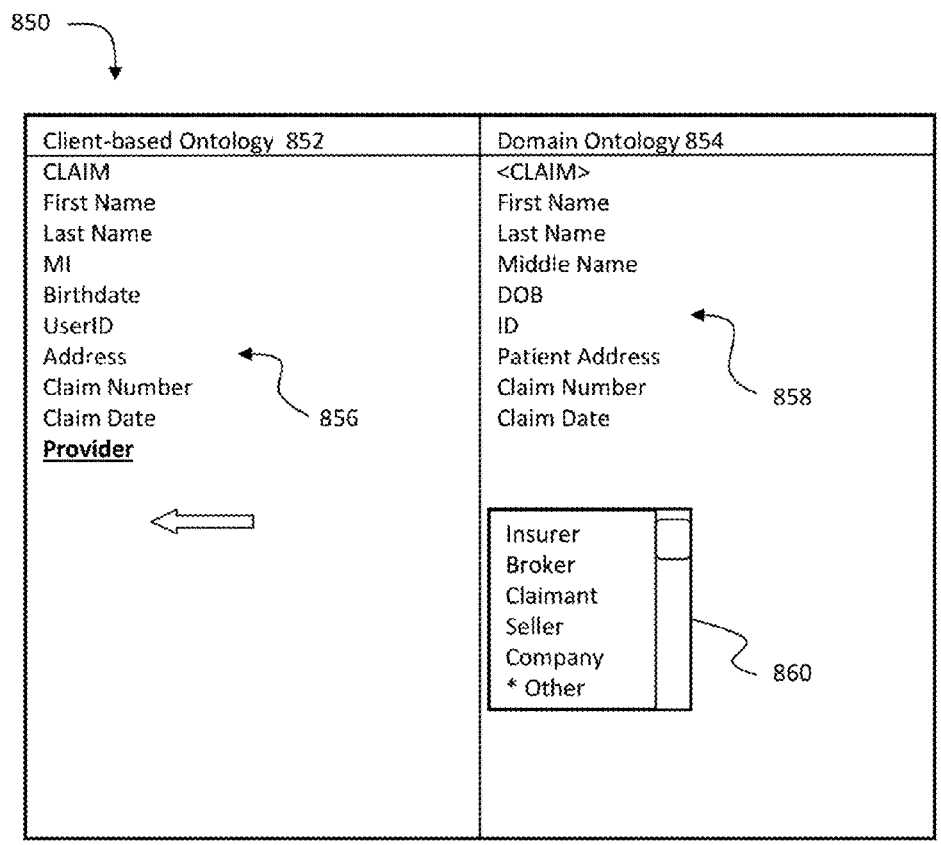
FIG. 8B is an exemplary schematic diagram of a user interface used in generating bridging ontologies in accordance with exemplary embodiments of the present invention.

FIG. 8B is an exemplary schematic diagram of a user interface used in generating bridging ontologies in accordance with exemplary embodiments of the present invention. The exemplary diagram shows the different data class members 856 in a client-based ontology 852, which would be a data source from the client computer system, and the class members 858 in a target domain ontology 854. A bridging ontology may map the member MI from the client-based data source ontology 852 to the member Middle Name in the domain ontology 854. The user interface may provide a visualization of such a mapping, and/or may provide a tool for creating and/or editing such a mapping. In embodiments, a user may select data classes via selector 860 to view and/or edit associated electronic mappings.

Figure 9A:
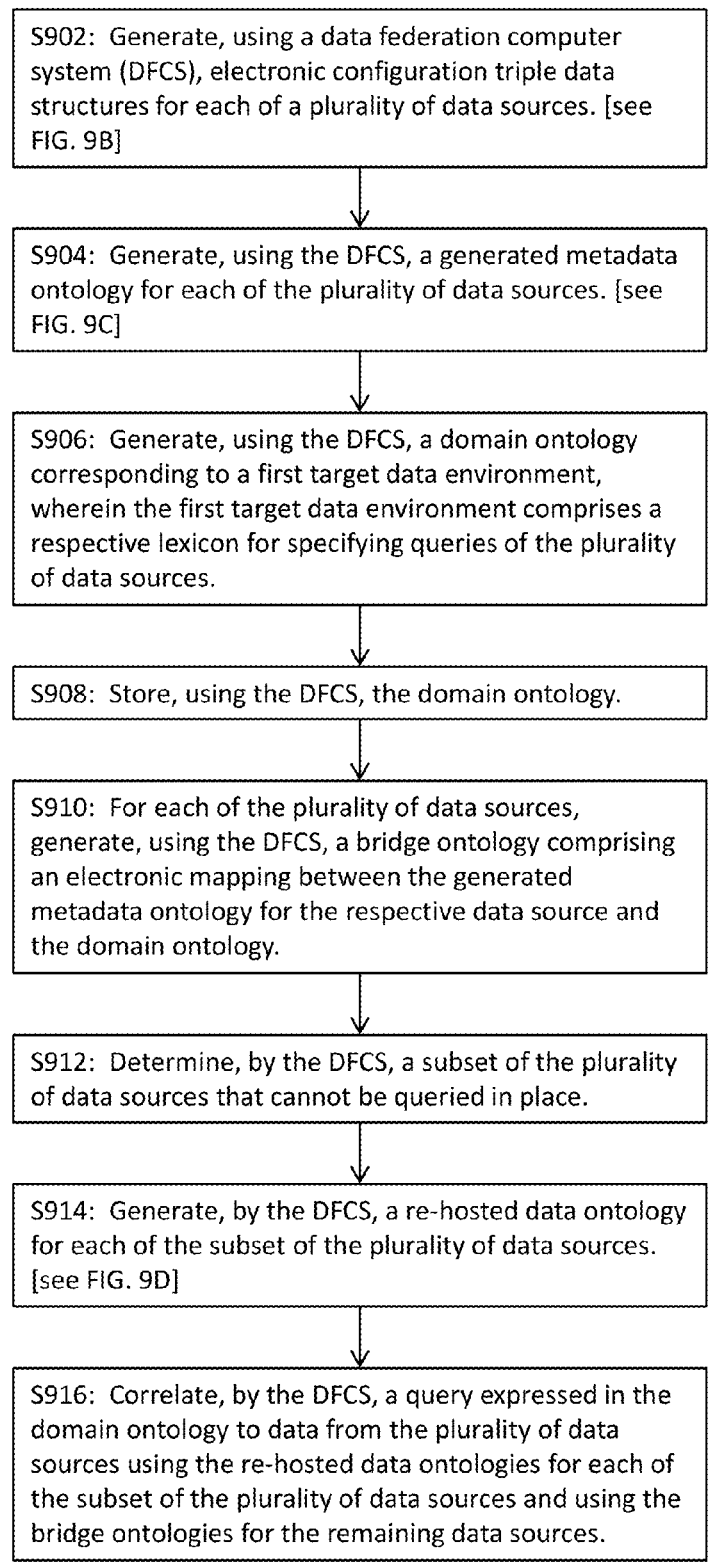
FIGS. 9A-D are flow charts of exemplary processes to federate a plurality of data sources in accordance with exemplary embodiments of the present invention.

FIGS. 9A-D are flow charts of exemplary processes to federate a plurality of data sources in accordance with exemplary embodiments of the present invention. FIG. 9A describes a main process to federate the data sources, while FIGS. 9B-D describe particular processes used in the federation process of FIG. 9A.

Figure 9B:
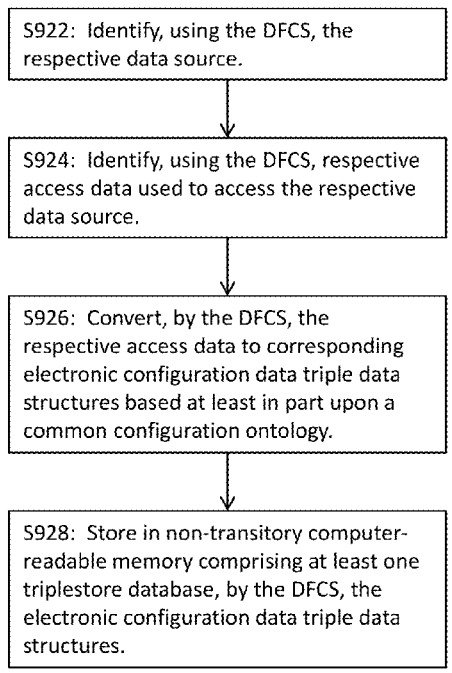

Referring first to FIG. 9A, in a step S902, a data federation computer system may generate electronic configuration triple data structures for each of a plurality of data sources. The electronic configuration triple data structures may comprise data for identifying and accessing each data source. FIG. 9B describes an exemplary process for generating the electronic configuration triple data structures based upon a common configuration ontology.

Figure 9C:
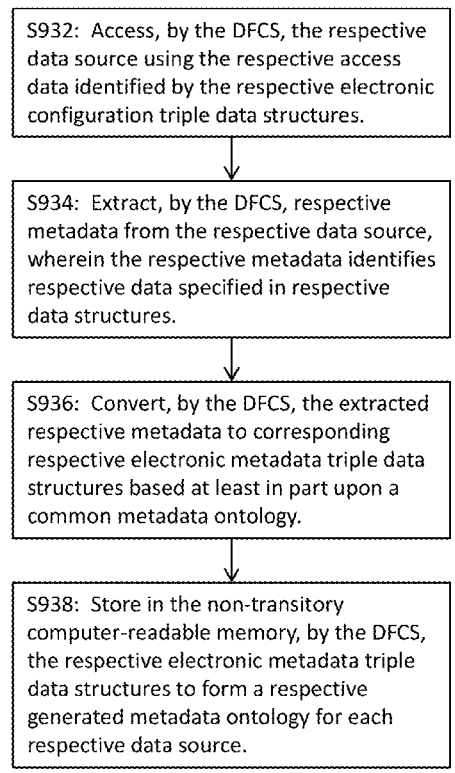

In a step S904, the data federation computer system may generate a generated metadata ontology for each of the plurality of data sources. The generated metadata ontology may indicate the data classes and members of those data classes present at each data source and may also indicate data types for each class member. FIG. 9C describes an exemplary process for generating the generated metadata ontologies.

In a step S906, the data federation computer system may generate a domain ontology corresponding to a first target data environment, wherein the first target data environment comprises a respective lexicon for specifying queries of the plurality of data sources. Accordingly, the domain ontology can include data classes and data class members having respective data types and/or formats consistent with the lexicon of lexicon of the target data environment.

In a step S908, the data federation computer system may store the generated domain ontology. The domain ontology may be stored as a plurality of triple data structures, e.g., in a triplestore database.

In a step S910, the data federation computer system may generate for each of the plurality of data sources a bridge ontology comprising an electronic mapping between the generated metadata ontology for the respective data source and the domain ontology. The bridge ontology can also comprise triple data structures relating the two ontologies. In embodiments, bridges may be generated between each data source and a plurality of domain ontologies corresponding to a plurality of data environments.

In a step S912, the data federation computer system may determine a subset of the plurality of data sources that cannot be queried in place. Such data sources can include flat files (e.g., spreadsheets) that do not have a data endpoint and/or data source that are not connected to a data network and/or cannot be accessed due to external constraints (e.g., security constraints, such as firewalls). In embodiments, it may be technically possible to query certain of these data source in place, but there may be performance drawbacks to doing so, such as slow connections, slow data source parsing speeds, and/or intermittent data source connections, and so the data federation computer system may determine and/or may be instructed to re-host such data sources.

Figure 9D:
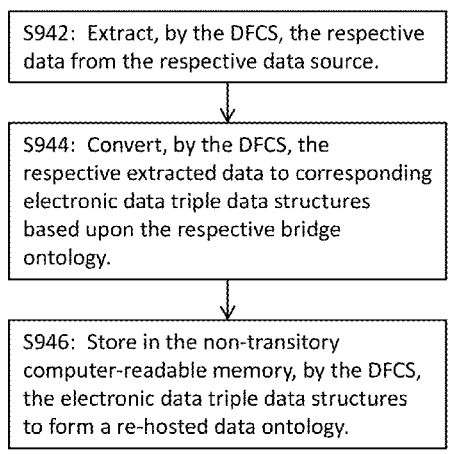

In a step S914, the data federation computer system may generate a re-hosted data ontology for each of the subset of the plurality of data source. FIG. 9D describes a process for re-hosting such data and transforming it to semantic triple data structures. Such re-hosting may be performed without normalizing data across all data sources.

In a step S916, the data federation computer system may correlate a query expressed in the domain ontology to data from the plurality of data sources using the re-hosted data ontologies for each of the subset of the plurality of data sources and using the bridge ontologies for the remaining data sources. In embodiments, the query may be received from a query source computer system or from a mapping resource associated with a bridge between the domain ontology and a sub-domain ontology. In embodiments, where a semantic wrapper is used in connection with a non-semantic data source and where the semantic wrapper comprises a translation of the bridge, the query correlation may be performed using the translated bridge ontology via the wrapper by directing the query to the semantic endpoint provided by the wrapper.

Turning to FIG. 9B, an exemplary process to generate electronic configuration triple data structures for each of a plurality of data sources can include performing the following steps for each of the plurality of data sources.

In a step S922, identifying, using the data federation computer, the respective data source. Such an identification can comprise a data source identifier (e.g., a uniform resource name (URN)) and/or an electronic address (e.g., a uniform resource identifier (URI), which may be a uniform resource locator (URL)) for the data source.

In a step S924, the data federation computer system may identify respective access data used to access the respective data source. Access data can include login credentials (e.g., username and/or password), connection type information, and/or data source type information (e.g., database type, flat file type, web service type, to name a few).

In a step S926, the data federation computer system may convert the respective access data to corresponding electronic configuration triple data structures based at least in part upon a common configuration ontology. The common configuration ontology may indicate the type of data generally required to access a data source or a data source of a particular type and/or how to organize such data into triple data structures.

In a step S928, the data federation computer system may store in non-transitory computer-readable memory comprising at least one triplestore database, the electronic configuration triple data structures.

FIG. 9C illustrates an exemplary process for generating a generated metadata ontology for each of the plurality of data sources by performing the following steps for each data source.

In a step S932, the data federation computer system may access the respective data source using the respective access data identified by the configuration triple data structures.

In a step S934, the data federation computer system may extract respective metadata from the respective data source, wherein the respective metadata identifies respective data specified in respective data structures. The metadata may not include the values of the respective data but rather the data classes and/or class members.

In a step S936, the data federation computer system may convert the extracted respective metadata to corresponding respective electronic metadata triple data structures based at least in part upon a common metadata ontology. The common metadata ontology may define concepts, such as data attributes, and/or may indicate how extracted metadata should be structured to form triple data structures. For example, a common metadata ontology may indicate how to transform data from a spreadsheet comprising columns and rows to triple data structures.

In a step S938, the data federation computer system may store in the non-transitory computer-readable memory the respective electronic metadata triple data structures to form a respective generated metadata ontology for each respective data source.

FIG. 9D illustrates an exemplary process for generating a re-hosted data ontology for each of the subset of the plurality of data sources that will not be queried in place, by performing the following steps for each of those data sources.

In a step S942, the data federation computer system may extract respective data from the respective data source. In embodiments, the generated metadata ontology for the data source may indicate what data is present for extraction.

In a step S944, the data federation computer system may convert the respective extracted data to corresponding electronic data triple data structures based upon the respective bridge ontology. In embodiments, a common data ontology may be used to determine how to structure the extracted data, e.g., as unmapped data triple data structures. The bridge ontology may then be used to transform the data to mapped triple data structures, which map to each target data environment. In embodiments, the generated metadata ontology and domain ontology may be used to transform the data to mapped triple data structures instead of first creating a bridge ontology. The result is a plurality of electronic data triple data structures, e.g., stored in a triplestore database and corresponding to the data extracted from the data source.

In a step S946, the data federation computer system may store in the non-transitory computer-readable memory the electronic data triple data structures to form a re-hosted data ontology.

In embodiments, the bridging methods described herein enable relatively rapid federation of a plurality of data sources without creating a data warehouse and hence without importing all data to a single database and without normalizing such data. The present invention thus bypasses the extract, transform, and load processes associated with data warehouses and instead provides a lightweight system that can query data sources in place and can extract only select data sources that either cannot be queried in place or cannot be queried efficiently in place. Each data source, whether it has remained in place or been re-hosted, can then be queried as a single federated system.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A computer-implemented method comprising:
(a) generating, using a data federation computer system, electronic configuration triple data structures for each of a plurality of data sources by performing the following steps for each of the plurality of data sources:
  i. identifying, using a data federation computer system, the respective data source;
  ii. identifying, using the data federation computer system, respective access data used to access the respective data source;
  iii. converting, by the data federation computer system, the respective access data to corresponding electronic configuration triple data structures based at least in part upon a common configuration ontology; and
  iv. storing in non-transitory computer-readable memory comprising at least one triplestore database, by the data federation computer system, the electronic configuration triple data structures;
(b) generating, using the data federation computer system, a generated metadata ontology for each of the plurality of data sources by performing the following steps for each of the plurality of data sources:
  i. accessing, by the data federation computer system, the respective data source using the respective access data identified by the respective electronic configuration triple data structures;
  ii. extracting, by the data federation computer system, respective metadata from the respective data source, wherein the respective metadata identifies respective data specified in respective data structures;
  iii. converting, by the data federation computer system, the extracted respective metadata to corresponding respective electronic metadata triple data structures based at least in part upon a common metadata ontology; and
  iv. storing in the non-transitory computer-readable memory, by the data federation computer system, the respective electronic metadata triple data structures to form a respective generated metadata ontology for each respective data source;
(c) generating, using the data federation computer system, a domain ontology corresponding to a first target data environment, wherein the first target data environment comprises a respective lexicon for specifying queries of the plurality of data sources;
(d) storing, using the data federation computer system, the domain ontology;
(e) for each of the plurality of data sources, generating, using the data federation computer system, a bridge ontology comprising an electronic mapping between the generated metadata ontology for the respective data source and the domain ontology;
(f) determining, by the data federation computer system, a subset of the plurality of data sources that cannot be queried in place;
(g) generating, by the data federation computer system, a re-hosted data ontology for each of the subset of the plurality of data sources by performing the following steps for each of the subset of the plurality of data sources:
  i. extracting, by the data federation computer system, respective data from the respective data source;
  ii. converting, by the data federation computer system, the respective extracted data to corresponding electronic data triple data structures based upon the respective bridge ontology; and
  iii. storing in the non-transitory computer-readable memory, by the data federation computer system, the electronic data triple data structures to form a re-hosted data ontology; and (h) correlating, by the data federation computer system, a query expressed in the domain ontology to the data from the plurality of data sources using the re-hosted data ontologies for each of the subset of the plurality of data sources and using the bridge ontologies for the remaining data sources.

2. The computer-implemented method of claim 1, wherein the respective access data comprises identifications of an access point for the respective data source, a source type, connection information, and a target domain corresponding to the respective data source.

3. The computer-implemented method of claim 1, wherein at least one of the plurality of data sources is an external data source.

4. The computer-implemented method of claim 1, wherein at least one of the plurality of data sources is a relational database.

5. The computer-implemented method of claim 1, wherein at least one of the plurality of data sources is a non-relational database.

6. The computer-implemented method of claim 1, wherein at least one of the plurality of data sources is a flat file.

7. The computer-implemented method of claim 6, wherein the flat file is a spreadsheet.

8. The computer-implemented method of claim 1, wherein at least one of the plurality of data sources is a web service.

9. The computer-implemented method of claim 1, wherein at least one of the plurality of data sources is a semantic data source comprising a semantic data endpoint.

10. The computer-implemented method of claim 1, wherein at least one of the plurality of data sources is a non-semantic data source comprising a non-semantic data endpoint.

11. The computer-implemented method of claim 10, further comprising the step of:
(i) providing, by the data federation computer system, a semantic data endpoint for the non-semantic data endpoint.

12. The computer-implemented method of claim 11, wherein providing a semantic data endpoint comprises implementing a wrapper tool.

13. The computer-implemented method of claim 12, wherein the wrapper tool comprises a translation of the respective bridge ontology that expresses the respective data source in a semantic language corresponding to the domain ontology.

14. The computer-implemented method of claim 13, wherein the wrapper tool is a web service wrapper tool that provides a semantic data endpoint for a non-semantic web service.

15. The computer-implemented method of claim 1, wherein the domain ontology is based at least in part upon an upper domain ontology comprising identifications of data structure relationships applicable to a plurality of target data environments.

16. The computer-implemented method of claim 1, wherein the bridge ontology comprises an electronic mapping between the generated metadata ontology for the respective data source and a plurality of domain ontologies, wherein each of the plurality of domain ontologies corresponds to a respective target data environment comprising a respective lexicon for specifying queries of the plurality of data sources.

17. The computer-implemented method of claim 1, further comprising the steps of:
(i) generating, using the data federation computer system, a second bridge ontology comprising an electronic mapping between the domain ontology and a first sub-domain ontology wherein the first sub-domain ontology corresponds to a respective lexicon for specifying queries of the plurality of data sources.

18. The computer-implemented method of claim 17, further comprising the steps of:
(j) generating, using the data federation computer system, a third bridge ontology comprising an electronic mapping between the domain ontology and a second sub-domain ontology wherein the second sub-domain ontology corresponds to a respective lexicon for specifying queries of the plurality of data sources.

19. A system for federating a plurality of data sources comprising:
(a) one or more processors;
(b) one or more storage devices comprising non-transitory computer-readable memory storing one or more databases, wherein at least one database is a semantic triplestore database;
(c) a data source configuration module stored on the one or more storage devices and configured to generate electronic configuration triple data structures for each of the plurality of data sources by identifying the respective data source, identifying respective access data used to access the respective data source, converting the respective access data to corresponding electronic configuration triple data structures based at least in part upon a common configuration ontology, and storing the electronic configuration triple data structures;
(d) a metadata ontology module stored on the one or more storage devices and configured to generate a metadata ontology for each of the plurality of data sources by accessing the respective data source using the respective access data, extracting respective metadata identifying respective data specified in respective data structures, converting the extracted respective metadata to corresponding respective electronic metadata triple data structures based at least in part upon a common metadata ontology, and storing the respective electronic metadata triple data structures;
(e) a domain module stored on the one or more storage devices and configured to generate domain ontologies each corresponding to a respective target data environment;
(f) a bridging module stored on the one or more storage devices and configured to generate for each data source a bridge ontology mapping the respective data source to a domain ontology;
(g) a data extraction module stored on the one or more storage devices and configured to extract source data from one or more data sources;
(h) a data conversion module stored on the one or more storage devices and configured to convert extracted source data to corresponding electronic data triple data structures based upon the respective bridge ontology and the respective extracted metadata; and
(i) a data model generation module stored on the one or more storage devices and configured to generate data models based at least in part on the domain ontologies, the bridge ontologies, and the metadata triples.

20. The system of claim 19, further comprising:
(j) an analytics module stored on the one or more storage devices and configured to determine data from one or more data sources that matches a query specified in a domain ontology.

\* \* \* \* \*